May 21, 1968 MINORU TESHIMA 3,384,789

APPROACH SWITCH APPARATUS

Filed Oct. 19, 1964

United States Patent Office 3,384,789
Patented May 21, 1968

3,384,789
APPROACH SWITCH APPARATUS
Minoru Teshima, Tokyo, Japan, assignor of forty percent to James M. Morita, Honolulu, Hawaii, forty percent to Minoru Fukumitsu, and twenty percent to Minoru Teshima, both of Tokyo, Japan Filed Oct. 19, 1964, Ser. No. 404,771
1 Claim. (Cl. 317—146)

ABSTRACT OF THE DISCLOSURE

An approach switch having an oscillator circuit with a first inductor coil and a second coil inductively coupled to this first coil with a source of direct current being connected to the second coil and a voltage-sensitive variable capacitance diode also connected to the source of direct current and an ambient electrostatic capacity sensitive antenna means connected to the second inductor coil. A coupling capacitor connects the diode to the second inductor coil and a rectifier and switch circuit is connected to the oscillator circuit with an output means connecting the rectifier and switch means to the source of direct current. Further, a resistance capacitance delay device connects the switch circuit to the diode such that the capacitance of the diode varies during oscillation of the oscillating circuit for automatically adjusting the sensitivity of the diode. Finally, control apparatus is connected to the switch circuit for controlling the electrical load.

*Drawing*

Figure 2:
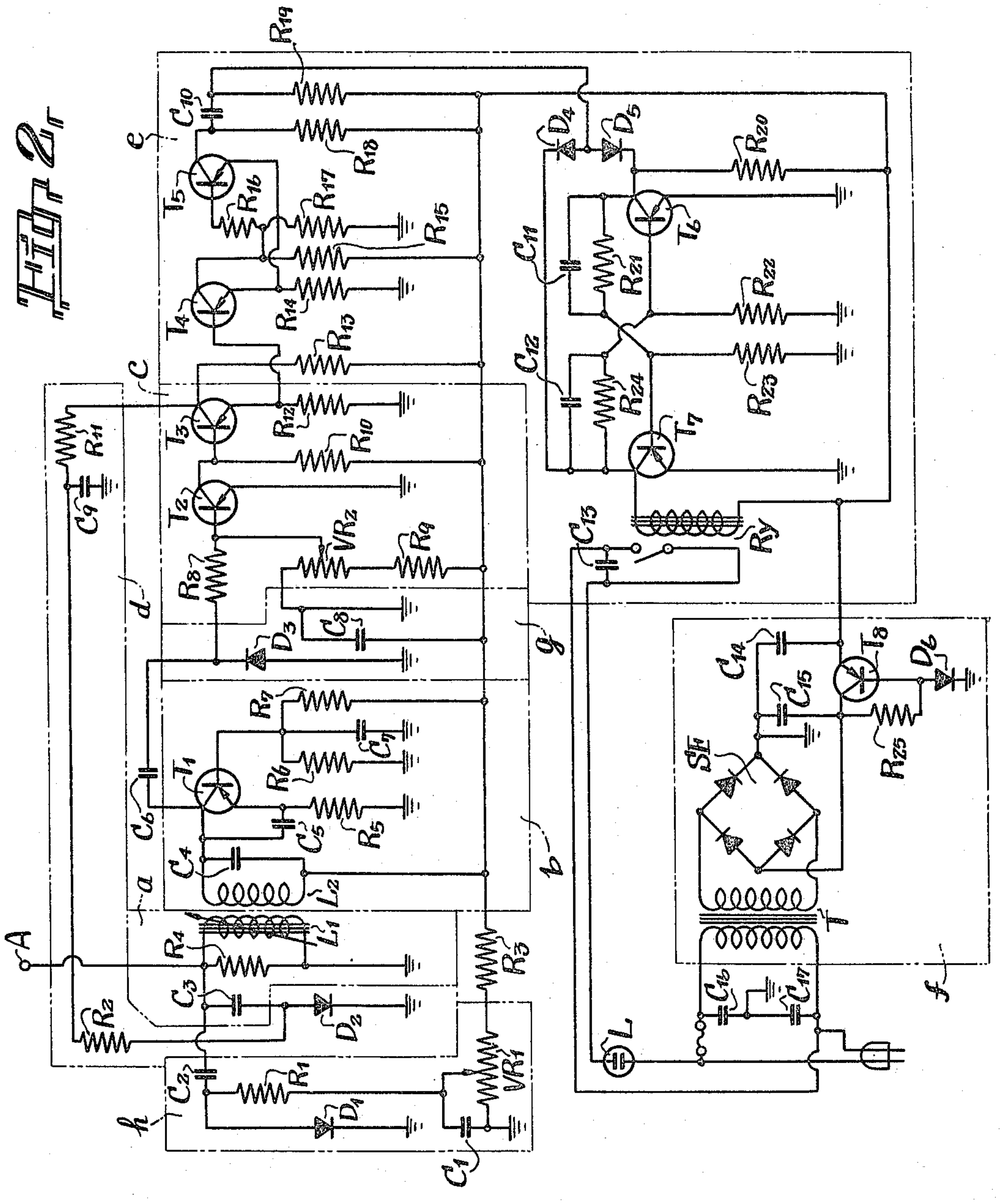
Figure 1:
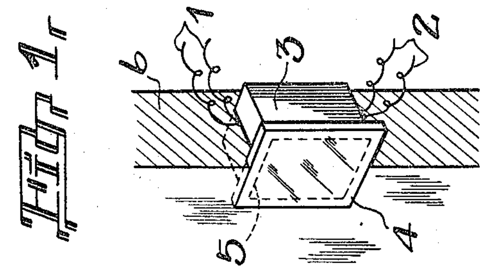

FIG. 1 shows a perspective view of an approach switch apparatus according to the invention; and FIG. 2 is a transistorized circuit diagram of the circuitry of the invention.

*Detailed description*

This invention relates to a new and novel approach switch apparatus, and more particularly, to a switch which is operated sensitively and automatically by the aid of an electrostatic capacitance change, when an agency, whether be it a human body or other object, comes near an approach switch.

An object of the invention is to provide an improved approach switch which can be installed inside the concealed part of a wall or set up inside the base of an electric lamp stand or is placed in a container; in other words, the approach switch can be installed so as to be out of view.

Briefly, the invention contemplates an approach switch comprising an antenna circuit which drives a transistor relay circuit, the relay circuit includes a transistor switch which has a flip-flop action. When a person or other agency approaches the antenna circuit, the electrostatic field changes. The field changes cause the switch to change state. The switch can drive an electrical load.

If the electric load such as an electric lamp is to be switched on, a person must merely come near the approach switch. When, in the next place, it is intended to switch off the electric lamp, the person first withdraws from the approach switch some distance, and then again nears the approach switch. Then, a variation of the electrostatic capacitance will be sensed by the antenna circuit. The change in the electrostatic capacitance causes the approach switch to switch the lamp on or off.

While the process of controlling an electric load has been described with respect to an electrical lamp, it should be apparent it can control other electric appliances, such, as, electric motors, radios, television sets and other various electrical tools. An advantage of the invention is that electric appliances can be switched on or off without touching the appliances by a person with his hand or other objects.

Numerous objects and advantages according to this invention will be apparent from the following detailed description, which, taken in connection with the accompanying drawings, discloses a preferred embodiment thereof.

Referring now in detail to FIG. 1, there is shown an approach switch which is installed in the wall 6. Leads for connecting the switch to electric load for "open or closing" are shown at 1, and leads for connecting the switch to a commercial A.C. power source are shown at 2; 3 is a switch case or housing; 4 a front case plate which is made of electric insulating materials such as synthetic resins; and 5 an antenna plate which is attached on back side of the plate 4.

Referring now to FIG. 2, there is shown a completely transistorized relay operating circuit which is enclosed in the interior of the switch case 3. In this figure, A represents the antenna plate 5 of FIG. 1, and L represents the electric loads such as a lamp; *a*, represents an antenna circuit; *b* an oscillating circuit; *c* a switch circuit; *d* a variable capacitance time constant circuit; *e* a trigger circuit and a flip-flop circuit; *f* a rectifier and a constant voltage circuit; *g* a rectifying circuit; and *h* a fine control circuit.

The antenna lead of the plate in the antenna circuit *a* is connected with a terminal or signal input A. The transistor $T_1$ of the oscillation circuit *b* comprising transistor $T_1$, inductor $L_2$, capacitors $C_4$, $C_5$ and $C_7$, resistors $R_3$, $R_4$ and $R_5$ is of the grounded-base type. Further, the oscillation circuit, in the circuit of the present embodiment, is of Colpitts type, but any other oscillation circuit such as Hartley type may be employed although it is preferable to use a stable oscillation circuit.

Inductor L of the antenna circuit, which is wound on the same bobbin reel as inductor $L_2$, is inductively coupled thereto. Capacitor $C_3$, resistor $R_4$ and the antenna lead or plate are connected with the one terminal of inductor $L_1$ whose other terminal is grounded. The anode terminal of variable capacitance diode $D_2$ and the resistor $R_2$ which supplies the voltage to diode $D_2$ are connected with the other terminal of capacitor $C_3$. The cathode terminal of variable capacitance diode $D_2$ is connected to the grounded positive output of power source rectifying circuit *f*.

The oscillating output of the first transistor $T_1$ in the oscillating circuit *b* passing through the coupling capacitor $C_6$ is rectified by the diode $D_3$ in the rectifying circuit *g*, and fed via resistor 8 to the base of transistor $T_2$ of the switch or amplifying circuit. The operating point of switch circuit is also adjusted by the variable resistor $VR_2$.

The collector of the transistor $T_3$ of the amplifying circuit *c* is connected to one lead of capacitor $C_9$ across resistor $R_{11}$ of a variable capacitance time constant circuit *d*, and the other lead of capacitor $C_9$ is grounded. The collector of transistor $T_3$ is also connected to the diode $D_2$ across resistor $R_2$ through the connected point between capacitor $C_9$ and resistor $R_{11}$, and to capacitor $C_3$. Thus, the variable capacitance time constant circuit, e.g., compensation circuit is established including the above circuit comprising the collector of $T_3$, capacitor $C_9$, resistor $R_{11}$, variable capacitance diode $D_2$, resistor $R_2$ and capacitor $C_3$. The capacitor $C_3$ is included in the antenna circuit described above.

Transistors $T_4$ and $T_5$ form a Schmitt type circuit operated by the change of emitter current of the transistor $T_3$ of the amplifying circuit C. When a current flows to the transistor $T_3$ and goes across the working point of the Schmitt circuit, the transistor $T_5$ thereupon becomes conductive rapidly. The collector of the said transistor $T_5$ is connected with a capacitor $C_{10}$, a resistor $R_{18}$; the other side of the said capacitor $C_{10}$ is connected with $R_{19}$; and one trigger pulse is produce by the pulse voltage formed with the rapid conduction of the transistor $T_5$. The trigger pulse triggers alternately both transistors $T_6$ and $T_7$ of the flip-flop circuit. The collector of transistor $T_7$—one terminal of the flip-flop circuit—is connected to one terminal of relay $R_y$ whose terminal is connected to negative output of the power source rectifying circuit *f*. Therefore, if the transistor $T_7$ is on, the coil of relay $R_y$ will be excited magnetically and the contact point of the relay $R_y$ will be closed. The lamp L will be lighted.

In the same way, if the other transistor $T_6$ is turned on by the next trigger pulse from the trigger circuit *e*, the transistor $T_7$ will cut off and the relay $R_y$ will be de-energized. On this occasion, the contact point of the relay will be opened and the lamp L will be turned off.

When the power source rectifying circuit *f* is connected with a commercial A.C. power source, the voltage is stepped down by the transformer T. Then, the stepped-down voltage will be rectified by the rectifier SE to D.C., which is filtered by capacitor $C_{15}$, and fed to the collector of transistor $T_8$. A certain constant voltage is fed to the base of transistor $T_8$ by means of resistor $R_{25}$ and Zener-diode $D_6$, and consequently, the emitter voltage of transistor $T_8$ remains unaltered, even though there occurs a voltage change of the collector $T_8$. Hence, each circuit fed from the emitter of transistor $T_8$ is stable.

Through the constant voltage circuit *f*, the current will be fed to the system including antenna circuit *a*, oscillating circuit *b*, amplifying circuit *c*, variable capacitance time constant circuit *d*, and trigger and flip-flop circuit *e*.

When the system is energized, transistor $T_1$ of oscillating circuit *b* begins oscillating, its energy is rectified by diode $D_3$ of oscillating rectifying circuit *g*, and the rectified energy is fed to the amplifying circuit *c*. However, this voltage is positive, and $T_2$ and $T_3$ of the amplifying circuit will turn OFF and ON respectively; $T_4$ and $T_5$ of the Schmitt circuit will turn ON and OFF respectively, so that the pulse voltage will not come up. The operating frequency of the circuit of inductor $L_1$ connected inductively to the inductor $L_2$ of oscillating circuit *b* is preliminarily adjusted slightly higher than the oscillating frequency of inductor $L_2$. The increase of the electrostatic capacitance according to the approach of a human body or other object towards the antenna plate connected to the terminal of antenna causes the frequency of inductor $L_1$ to approach the oscillating frequency of $L_2$. When the frequencies coincide, inductor $L_1$ acts as a trap for inductor $L_2$ and absorbs the oscillating power of inductor $L_2$. Accordingly, the electric potential on the base of transistor $T_2$ of the amplifier circuit *c* will drop and the "cut-off" of transistor $T_2$ will be removed. Then, transistor $T_2$ will be turned as "on" and transistor $T_3$ will be turned "off."

Subsequently, in the Schmitt circuit, the transistor $T_4$ is turned as "off" and transistor $T_5$ is "on," and one trigger pulse is produced, and through such change, the working conditions of the transistors $T_6$ and $T_7$ of the flip-flop circuit will reverse each other.

On the other hand, the collector of transistor $T_3$ of amplifying circuit *c* feeds an electric potential to the anode of variable capacitance diode $D_2$ through resistor $R_{11}$ and capacitor $C_9$ of the time constant circuit and also through resistor $R_2$.

A voltage is fed to the collector of transistor $T_3$ via resistor $R_{13}$ from the negative terminal of the power rectifying circuit *f*. When the transistor $T_3$ is turned on, electric current will flow to the collector thereof and the voltage of the collector will be diminished by the resistor $R_{13}$, and the emitter voltage of the transistor $T_3$ gives voltage to the transistor $T_4$, and since $T_4$ is ON now, the said emitter voltage will be small in amount.

In consequence, a slight difference of voltage ensues between the voltage of collector of transistor $T_3$ and the positive output of power source rectifying circuit *f*. Hence, the variable capacitance diode $D_2$ has almost no potential difference. However, when the transistor $T_3$ of amplifying circuit *c* is turned OFF, in other words, a human body or the like approaches so that this circuit comes to work and no electric current flows into the collector, so that there appears a large potential difference between potential of collector of transistor $T_3$ and that of positive output of electric source *f*. Therefore, capacitor $C_9$ of variable capacitance time constant circuit *d* is charged through resistor $R_{11}$. After a period of delay caused by capacitor $C_9$ and resistor $R_{11}$, the variable capacitance diode $D_2$ will have a large potential difference, and then its capacitance will drop. As is known, the actual capacitance value of variable capacitance diode $D_2$ is dependent upon the D.C. or A.C. bias voltage that is applied, and the capacitance can be varied over the range of 10-to-1 with a bias change from 0 to 100 volts. The current demand on the bias supply is on the order of a few microamperes.

When an operator approaches the antenna plate with his hand, the elastrostatic capacitance of antenna will increase with the addition of that of the hand. However, the resulting capacitance of antenna plate will decrease rapidly, even though the operator keeps his hand near this antenna plate. This rapid decrease of capacitance is one of the features of the invention. Because as described above, the antenna plate is connected to the anode of variable capacitance diode $D_2$ via coupling capacitor $C_3$, and is connected to the time constant circuit by $R_2$, so the increase of electrostatic capacitance of antenna caused by the approach of hand corresponds to the increase of voltage applied to variable capacitance diode $D_2$. However, the inner capacitance of variable capacitance diode $D_2$ is reduced by the unique function thereof. This means that on account of the said reduction the electrostatic capacitance applied onto the antenna plate connected capacitance-wise by the capacitor $C_3$ is decreased as much as the reduced amount of capacitance of the variable capacitance diode $D_2$.

Thus, the variation of electrostatic capacitance at this moment will act to offset the electrostatic capacitance of the operator's hand applied to that of antenna plate. Consequently, even if a human body moves a slight distance away from the antenna plate, the transistor $T_3$ of amplifying circuit *c* will be turned "on" by such a change as above; then, electric current will flow into the collector of transistor $T_3$ and the capacitor $C_9$ discharges.

Whereas, the voltage of charged capacitor $C_9$ is discharged by the action of $R_{11}$, transistor $T_3$ and resistor $R_{12}$, and consequently the potential difference of the diode $D_2$ is diminished, indicating the accrual of capacitance of diode $D_2$. Therefore, this increase of capacitance of diode $D_2$ corresponds to the increase of antenna capacitance via coupling capacitor $C_3$, which shows an initial condition of approach switch of the invention.

If and when there occurs an increase or decrease of electrostatic capacitance due to the external condition of temperature, humidity or the like to or from that of antenna plate for a time longer than the time constant of capacitor $C_9$ and resistor $R_{11}$, the approach switch of this invention will not work. Because the variation of collector voltage of $T_3$ will be a variation of potential of variable capacitance diode $D_2$ to result in an increase or decrease of its capacitance and in cancellation of an increase or decrease of electrostatic capacitance to or from the antenna plate.

The sensitivity regulating circuit *h* starting from the ungrounded terminal of inductor $L_1$ of antenna circuit *a* and passing via capacitor $C_2$ is connected to the anode of variable capacitance diode $D_1$. The junction of diode $D_1$ and capacitor $C_2$ is connected to the center of variable resistor $VR_1$. Potentiometer action is provided by resistors $VR_1$ and $R_3$ connected in series between positive and negative outputs of power rectifying circuit *f*.

Consequently, the anode voltage of variable capacitance diode $D_1$, one terminal of which is grounded, can be adjusted by the variable resistor $VR_1$, and to vary the capacitance of variable diode $D_1$. Thus, a fine or sensitive adjustment can be made at the working point of antenna circuit *a*.

Various modifications may be employed without departing from the spirit and scope of the invention as set forth in the accompanying drawings and foregoing specification, and as defined in the following claim.

What is claimed is:

1. An approach switch apparatus comprising an oscillator circuit including a first inductor coil, a second inductor coil inductively coupled to said first inductor coil and including first and second terminals, a source of direct current including first and second outputs, one terminal of said second inductor coil being connected to one of said outputs, a voltage-sensitive variable capacitance diode including an anode and a cathode, means for connecting said cathode to one of the outputs of said source of direct current, an ambient electrostatic capacity sensitive antenna means connected to other terminal of said second inductor coil, a coupling capacitor for connecting the anode of said diode to the other terminal of said second inductor coil, a rectifier and switch circuit means including an input connected to said oscillator circuit and an output means for connecting the output of said rectifier and switch means to the other output of said source of direct current, a resistance-capacitance delay means for connecting the output of said switch circuit means to the anode of said diode so that the capacitance of said diode varies during the oscillations of said circuit to automatically adjust the sensitivity of said diode, and control means connected to said switch circuit means for controlling an electrical load.

References Cited

UNITED STATES PATENTS

| | | | |
|---|---|---|---|
| 3,109,893 | 11/1963 | Burns. | |
| 3,184,689 | 5/1965 | Wylde | 331—65 X |
| 3,034,022 | 5/1962 | Woeland | 317—146 |

LEE T. HIX, *Primary Examiner.*